(No Model.)
G. W. HASENRITTER.
MEAT CHOPPING IMPLEMENT.
No. 567,471. Patented Sept. 8, 1896.
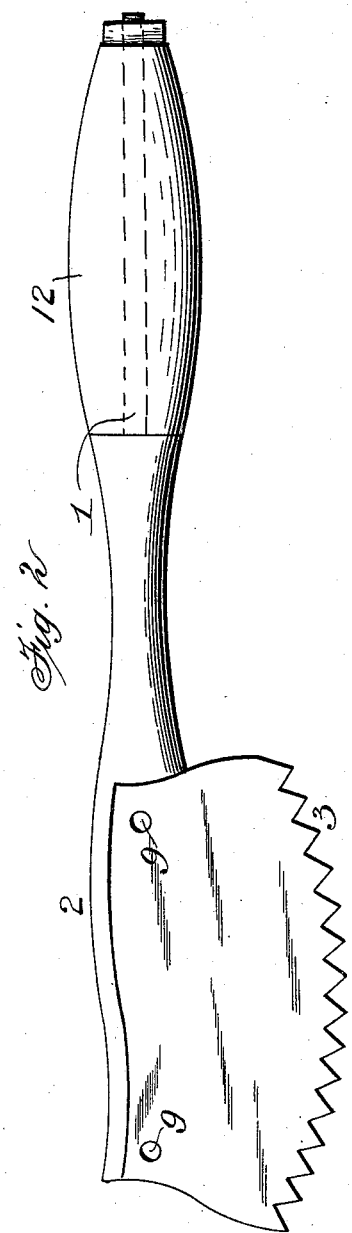
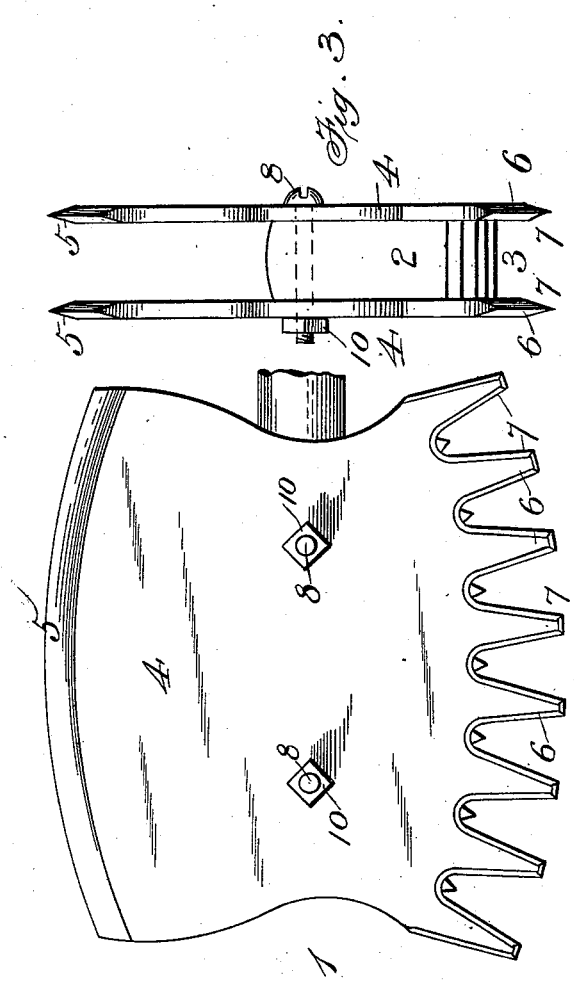
Witnesses.
Inventor.
George W. Hasenritter,
Attorneys.

UNITED STATES PATENT OFFICE.

GEORGE W. HASENRITTER, OF HERMANN, MISSOURI.

MEAT-CHOPPING IMPLEMENT.

SPECIFICATION forming part of Letters Patent No. 567,471, dated September 8, 1896.

Application filed May 17, 1895. Serial No. 549,632. (No model.)

*To all whom it may concern:*

Be it known that I, GEORGE W. HASENRITTER, a citizen of the United States, residing at Hermann, in the county of Gasconade and State of Missouri, have invented a new and useful Implement for Cutting or Chopping, Slashing, and Mashing Meat, of which the following is a specification.

My invention relates to a combination tool or implement for the use of butchers and others, by which meat may be chopped and slashed to reduce it to a finely-divided condition and mashed or pounded to render it tender, and which may also be used as a cleaver for cutting bone and for other similar purposes.

The invention consists in the novel construction and combination of parts hereinafter fully described and claimed.

In the accompanying drawings, Figure 1 is a side elevation of a tool or implement constructed in accordance with my invention. Fig. 2 is a similar view, the chopping and slashing blades being removed. Fig. 3 is an end view of the complete tool shown in Fig. 1.

In the said drawings, the reference-numeral 1 designates a metal shank having cast integral therewith at one end a block or head 2, the under side of which is made convex and formed with a number of short, V-shaped, transverse teeth 3. The opposite or upper side of this block or head is made plain or flat.

The numeral 4 designates two flat metal blades, the upper sides of which are convexed and beveled to form cutting-edges 5, while the lower side is similarly convexed and formed with a number of long teeth 6, the sides of which are beveled to form cutting-edges 7. These blades are secured to opposite sides of the head or block by means of screw-bolts 8, passing through apertures therein and through registering apertures 9 in the block or head. As will be seen, the construction is such that when the blades are secured to the block or head the teeth of the latter will project beyond the bases of the teeth of the blades and between the edges thereof.

The numeral 10 designates nuts for securing the bolts 8 in place, and 12 designates a wooden handle secured to the shank 1.

By a tool or implement constructed as above meat can be chopped into fine pieces by means of the curved cutting-edges, and then by reversing the tool the meat can be reduced to a pulpy condition by slashing and mashing with the teeth of the head or block and the blades. By removing one of the blades the tool can be used as a cleaver, and by removing both the blades it can be used for mashing meat only.

Having thus fully described my invention, what I claim is—

1. As an improved article, a combination tool or implement comprising the shank, the head or block integral therewith, having one side convexed and formed with a series of transverse teeth, and the blades removably connected with said head and having one side formed with a convex cutting edge, and the opposite side formed with a series of teeth, substantially as described.

2. The combination with the shank and the head or block formed integral therewith, having transverse apertures therethrough, and one side convexed and formed with a series of short transverse teeth, of the blades secured to said head or block by removable bolts and nuts and projecting beyond the top and bottom of said heading a continuous curved cutting edge at one side and the opposite side or edge formed with a number of teeth, substantially as described.

G. W. HASENRITTER.

Witnesses:
HARRY W. TEKOTTE,
FERD. TEKOTTE.